P. A. GROTH.
CALF WEANER.
APPLICATION FILED APR. 3, 1917.

1,252,345.

Patented Jan. 1, 1918.

INVENTOR
Perrie A. Groth.

WITNESSES
F. C. Gibson.
J. Wilcox.

BY Victor J. Evans
ATTORNEY

UNITED STATES PATENT OFFICE.

PERRIE A. GROTH, OF LISBON, NORTH DAKOTA.

CALF-WEANER.

1,252,345.  Specification of Letters Patent.  Patented Jan. 1, 1918.

Application filed April 3, 1917. Serial No. 159,531.

*To all whom it may concern:*

Be it known that I, PERRIE A. GROTH, a citizen of the United States, residing at Lisbon, in the county of Ransom and State of North Dakota, have invented new and useful Improvements in Calf-Weaners, of which the following is a specification.

This invention relates to calf weaners and it consists in the novel features hereinafter described and claimed.

An object of the invention is to provide a weaner of the character stated which is of simple and durable structure and which may be easily and quickly applied to the head of an animal or removed therefrom.

With this object in view the weaner comprises a plate having angularly disposed front and side portions provided at their ends with outstanding prongs, there also being provided prongs curved upwardly and positioned at the upper portions of the said parts and which are formed from material which is cut from the front and side portions. The said plate is hingedly connected with a section which in turn is attached to a band adapted to pass around the jaws of the animal. A strap is connected with the said band and may pass around the head of the animal and a latch is attached to the said strap and adapted to pass under the throat of the animal.

In the accompanying drawing:—

Figure 1:
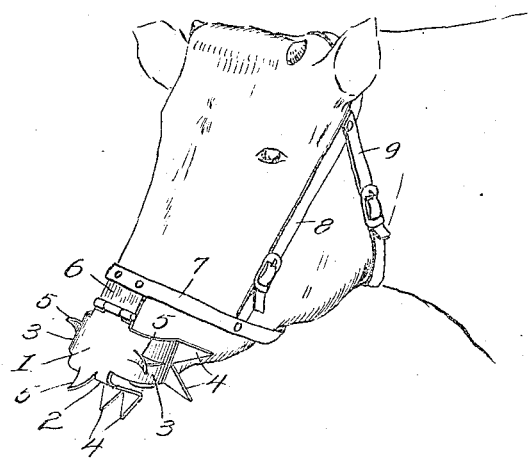
Figure 3:
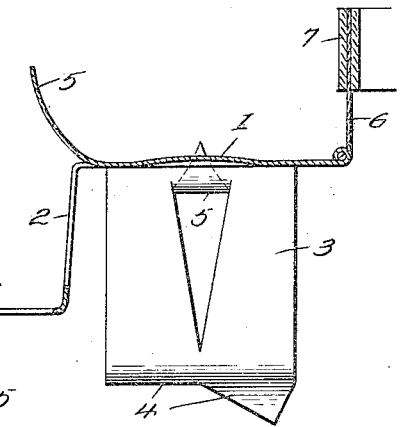
Figure 2:
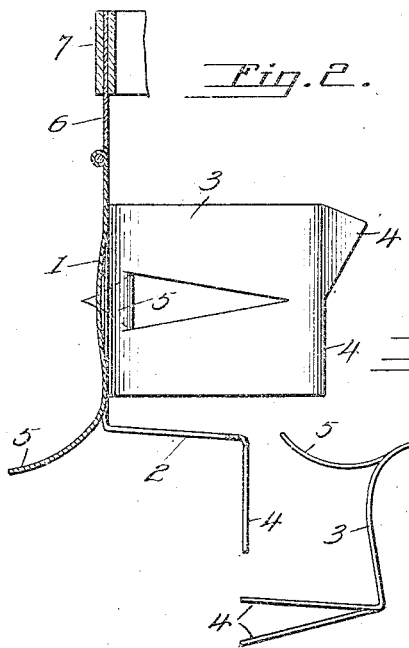
Figure 4:
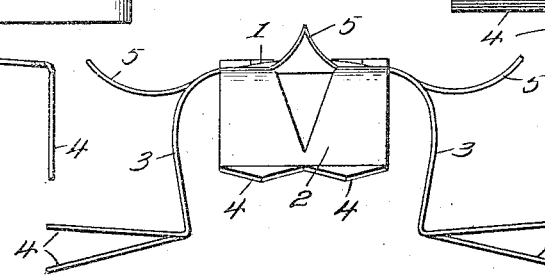

Figure 1 is perspective view of the weaner;

The other figures are detail views of the features thereof.

The weaner comprises a metallic plate 1 which is provided with an angularly disposed front portion 2 and angularly disposed side portions 3. The portions are provided at their lower edges with outstanding prongs 4. Prongs 5 are cut from the material at the upper part of the portions 2 and 3 and these prongs 5 are upwardly and outwardly curved with relation to the body portion of the plate 1. The plate 1 is hingedly connected with a section 6 which in turn is attached to a band 7 adapted to pass around the jaws of the animal when the device is applied whereby the plate 1 is held over the nose of the animal. An adjustable strap 8 is attached to the band 7 at the opposite side portion thereof and is adapted to pass around the head of the animal behind the ears. A latch strap 9 is connected with the strap 8 and is adapted to pass under the throat of the animal. The straps 8 and 9 may be adjusted longitudinally to fit the heads of animals of different sizes.

When the device is applied to the head of an animal the outstanding prongs will prevent the same from approaching a cow and at the same time when the animal is grazing the plate may swing in an upward direction whereby the lips may have free access to the grass or other food.

From the foregoing description taken in conjunction with the accompanying drawing, it will be seen that a simple and durable calf weaner is provided and that the same may be used to advantage for weaning the calf from the cow without separating them or placing them in different pastures.

Having described the invention what is is claimed is:—

A weaner comprising a plate curved to approximately fit the anterior portion of the proboscis of a bovine animal and having front and side portions which are spaced from each other at their side edges and being provided at their lower edges with outstanding prongs, the material from the upper parts of the said portions being formed into outwardly disposed prongs, the upper prongs being spaced from the lower prongs, the upper and lower prongs at the same portions of the plate being out of vertical alinement with relation to each other, a section hinged to the plate and a band for securing the section to the head of the animal.

In testimony whereof I affix my signature.

PERRIE A. GROTH.

Copies of this patent may be obtained for five cents each, by addressing the "Commissioner of Patents, Washington, D. C."